United States Patent [19]

Polgar

[11] Patent Number: 5,211,706
[45] Date of Patent: May 18, 1993

[54] STRAIN RELIEF SHELL FOR AN ELECTRICAL CONNECTOR

[75] Inventor: Gary E. Polgar, Bolingbrook, Ill.
[73] Assignee: Molex Incorporated, Lisle, Ill.
[21] Appl. No.: 895,974
[22] Filed: Jun. 9, 1992
[51] Int. Cl.⁵ .......................................... H01R 13/58
[52] U.S. Cl. .................................. 439/464; 439/465
[58] Field of Search ........ 439/456, 457, 460, 464–468, 439/470

[56] References Cited

U.S. PATENT DOCUMENTS

| | | | |
|---|---|---|---|
| 4,341,431 | 7/1982 | Woratyla | 339/103 |
| 4,358,178 | 11/1982 | Guy | 339/103 |
| 4,421,376 | 12/1983 | Cosmos et al. | 339/103 |
| 4,501,459 | 2/1985 | Chandler et al. | 439/466 X |
| 4,549,780 | 10/1985 | Bertini et al. | 339/107 |
| 4,606,596 | 8/1986 | Whiting et al. | 339/107 |
| 4,629,276 | 12/1986 | Genaro et al. | 339/103 |
| 4,682,836 | 7/1987 | Noorily et al. | 439/466 X |
| 4,842,550 | 6/1989 | Fry, Jr. et al. | 439/471 |
| 4,952,168 | 8/1990 | Schieferly et al. | 439/467 |

*Primary Examiner*—Eugene F. Desmond
*Attorney, Agent, or Firm*—Stephen Z. Weiss

[57] ABSTRACT

A strain relief shell is provided for relieving stress between an electrical connector and an electrical cable. The shell includes a pair of complementarily interengageable shell halves defining an interior cavity. The shell halves are releaseably engageable with the electrical connector on a given center line. A pair of cable exit openings are provided through the shell at different orientations such that the cable can exit from one opening in a direction generally parallel to the center line and from the other opening in one of two directions generally transverse to the center line. A pair of holding loops are formed integral with the shell, projecting into the interior cavity thereof, for holding a cable tie about the cable respectively in either of the directions thereof. Break-away plug portions are formed integrally with the respective shell halves for closing the cable exit openings. One or both of the plug portions in each opening is removable so that less than the entire respective cable exit opening can be exposed to accommodate different sized cables.

7 Claims, 3 Drawing Sheets

STRAIN RELIEF SHELL FOR AN ELECTRICAL CONNECTOR

FIELD OF THE INVENTION

This invention generally relates to the art of electrical connectors and, particularly, to a strain relief shell for relieving stress between an electrical connector and an electrical cable.

BACKGROUND OF THE INVENTION

Electrical connectors generally include a dielectric housing having electrically conductive terminals mounted therein and electrically connected within the housing to lead wires of an electrical cable. The connector is configured for mating with a complementary connector or other electrical component.

Electrical connectors often are employed in applications where relatively frequent mating and unmating of the connector to its complementary connector is likely. Although the connector housing and the terminals therein can be designed to accommodate frequent connection and disconnection, the connectors, themselves, often are not constructed to provide strain relief. Therefore, forces exerted on the lead wires, such as pulling on the cable external to the connector housing, can damage the electrical connections within the housing.

Consequently, various structures, such as backshells, have been used with electrical connectors to provide a degree of strain relief and to thereby prevent damage due to forces exerted on an electrical cable. In addition, such structures have been designed so that the cable can exit the shell in different orientations or angles relative to a center line of the electrical connector, such as providing either "90° or 180°" cable exiting. Still further, it has become desirable to use or make accommodations for using flexible cable ties to secure the cable to the strain relief shell, the cable ties often being conventional separate ratcheted tie devices.

Various problems have been encountered with strain relief shell structures of the character described above and which have been heretofore available. One of the problem areas is in strain relief shells which provide for plural cable exiting orientations (e.g. 90° and 180° cable exiting). At least a pair of openings are provided in the shell and through which the cable can exit. When the cable exits through one of the openings, the other opening should be sealed or closed so that access cannot be readily gained to the interior of the shell. Heretofore, separate plug devices have been employed to close the non-used opening. These plug devices add considerably to the cost of the overall shell construction, and the plugs are easy to lose or be misplaced. Another problem is that such openings are of a given size and, when a smaller cable (i.e. a cable with a smaller number of discrete lead wires) is used with the strain relief shell, the "used" opening is too big and also does not seal the interior of the shell. Still further, prior strain relief shells provide cable tie holding means which usually are on the exterior of the shell or protrude from the exterior of the shell, resulting in projections upon which other wires or extraneous components can become caught or snagged in particular environments.

This invention is directed to solving the above problems and satisfying the need for a simple, effective strain relief shell, particularly affording multiple cable exiting orientations.

SUMMARY OF THE INVENTION

An object, therefore, of the invention is to provide a new and improved strain relief shell for relieving stress between an electrical connector and an electrical cable or lead wire bundle.

In the exemplary embodiment of the invention, generally the strain relief shell includes a pair of complementarily interengageable shell halves defining an interior cavity. Means are operatively associated between the shell halves for releaseably engaging the electrical connector on a given center line. The invention contemplates plates that a pair of cable exit openings be provided through the shell at different orientations such that the cable can exit from one opening in a direction generally parallel to the connector center line and from the other opening in a direction generally transverse to the center line. A pair of holding means are provided integral with the shell in the interior cavity for holding a cable tie about the cable respectively in either of the parallel or transverse directions.

Preferably, each shell half is unitarily molded of dielectric material such as plastic or the like. The pair of holding means are molded integrally with each shell half on the interior thereof to prevent snagging with any extraneous devices or wires. As disclosed herein, the holding means are provided in the form of integrally molded, inwardly projecting loops.

A feature of the invention includes the provision of frangible or break-away plug means for removably closing the cable exit openings. The plug means are molded integrally with at least one of the shell halves. The material about the periphery of the plug means is weakened to facilitate breaking the plug means away from the at least one shell half.

In the preferred embodiment of the invention, the break-away plug means each include a first plug portion molded integrally with one of the shell halves and a second plug portion molded integrally with the other shell half. Therefore, less than the entire respective cable exit opening can be exposed to accommodate different sizes of cables simply by breaking-away the plug portion from only one of the shell halves. As disclosed herein, the cable exiting openings and the plug means are generally circular and the plug portions of the respective shell halves are generally semi-circular.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings in which like reference numerals identify like elements in the figures and in which:

DETAILED DESCRIPTION OF THE PREFERRED EMBODIMENT

Figure 1:
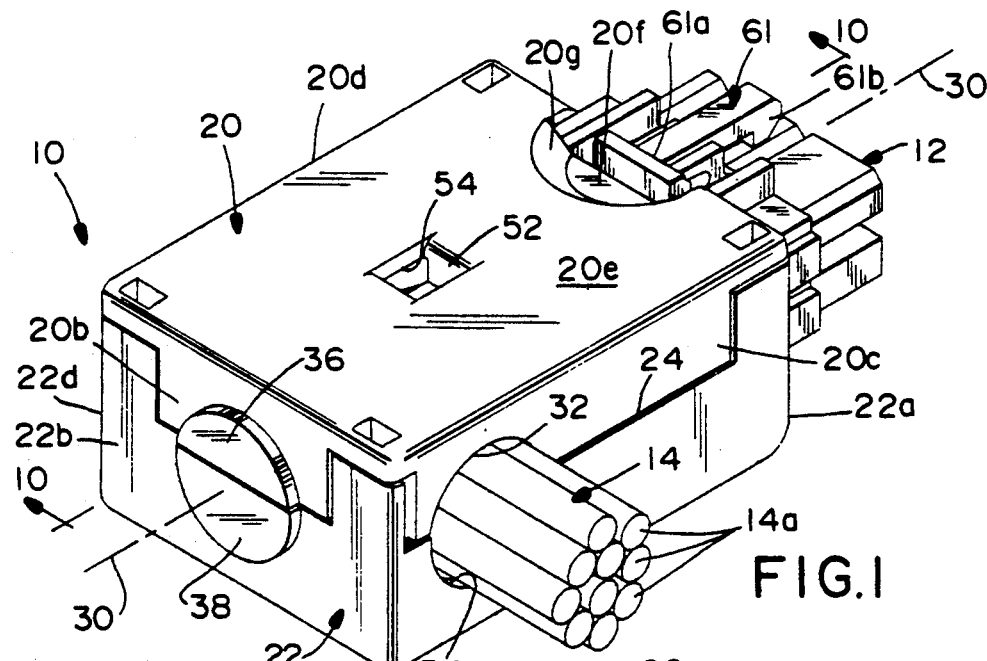
FIG. 1 is a perspective view of a strain relief shell embodying the concepts of the invention and shown secured to an electrical connector, with a cable exiting from one side of the shell.
Figure 2:
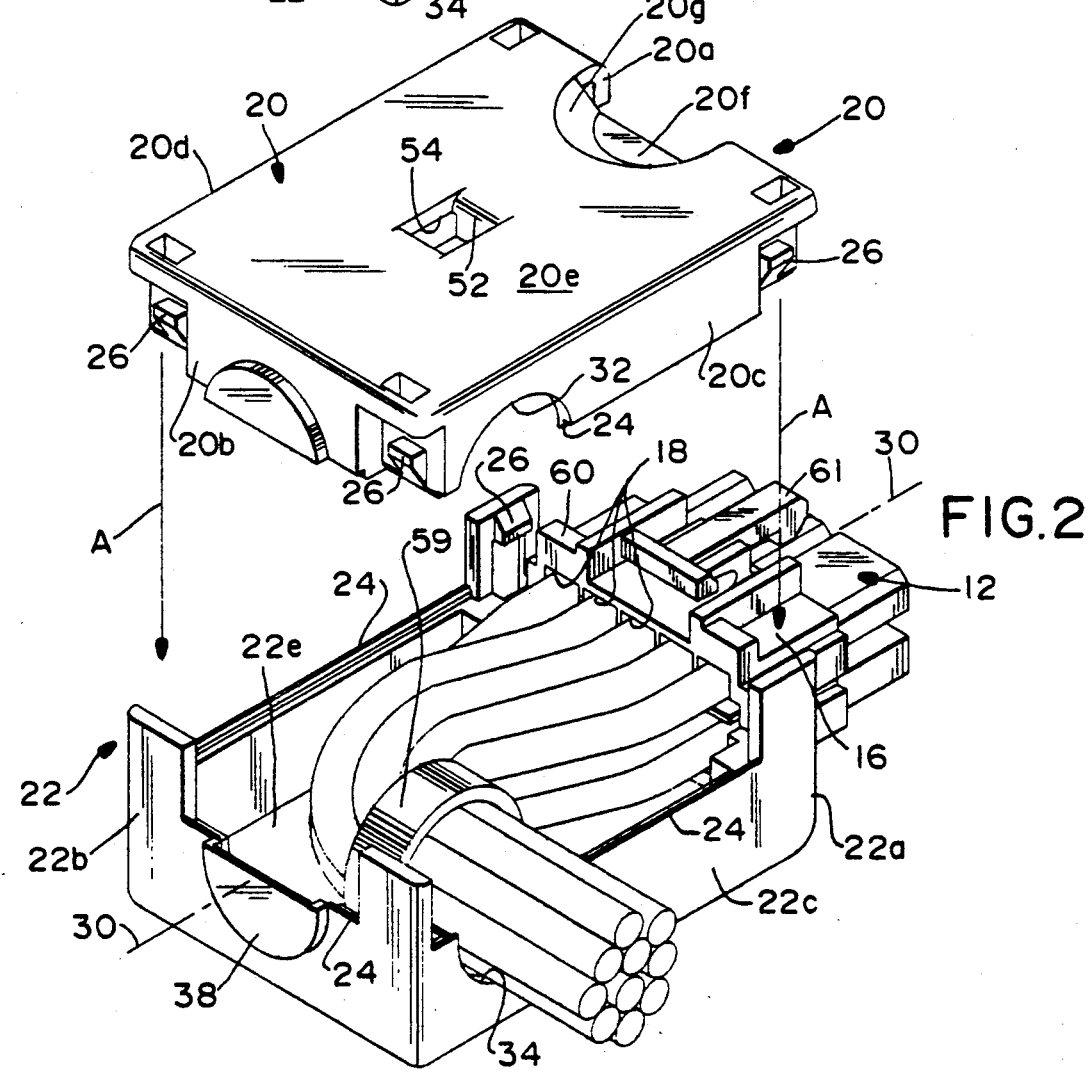
FIG. 2 is an exploded perspective view similar to that of FIG. 1, with the top shell lifted to facilitate the illustration.

Referring to the drawings in greater detail, and first to FIGS. 1 and 2, the invention is embodied in a strain relief shell, generally designated 10, for relieving stress between an electrical connector, generally designated 12, and an electrical cable, generally designated 14. At this point it should be understood that the use of the term electrical "cable" herein is meant to include any electrical wiring structure, including a wire bundle comprising a plurality of discrete electrical wires 14a as shown in the drawings. As is known, discrete wires 14a of electrical cable 14 comprise conductive leads which are terminated to electrical conductive terminals securely mounted within a housing 16 of connector 12. FIG. 2 shows the discrete wires entering the housing through rear openings 18 which are in communication with the terminals within the connector.

Strain relief shell 1 includes a pair of complementarily interengageable shell halves, generally designated 20 and 22. Shell half 20 includes a front wall 20a, a rear wall 20b and a pair of side walls 20c and 20d, all joined by a smooth top wall 20e. Shell half 22 includes a front wall 22a, a rear wall 22b, a pair of side walls 22c and 22d, all joined by a smooth bottom wall 22e. At least portions of the side and rear walls of the shells have oppositely stepped or notched edges 24 which interengage to provide a seal when the shell halves are interengaged. The shell halves are matingly assembled or interengaged in the direction of arrows "A" (FIG. 2). The shell halves include complementary interengaging cam latches 26 generally at the four corners of the shell halves, for snapping the shell halves into interengagement, with notched edges 24 sealing an interior cavity between the shells defined by the above-described walls thereof.

Figure 3:
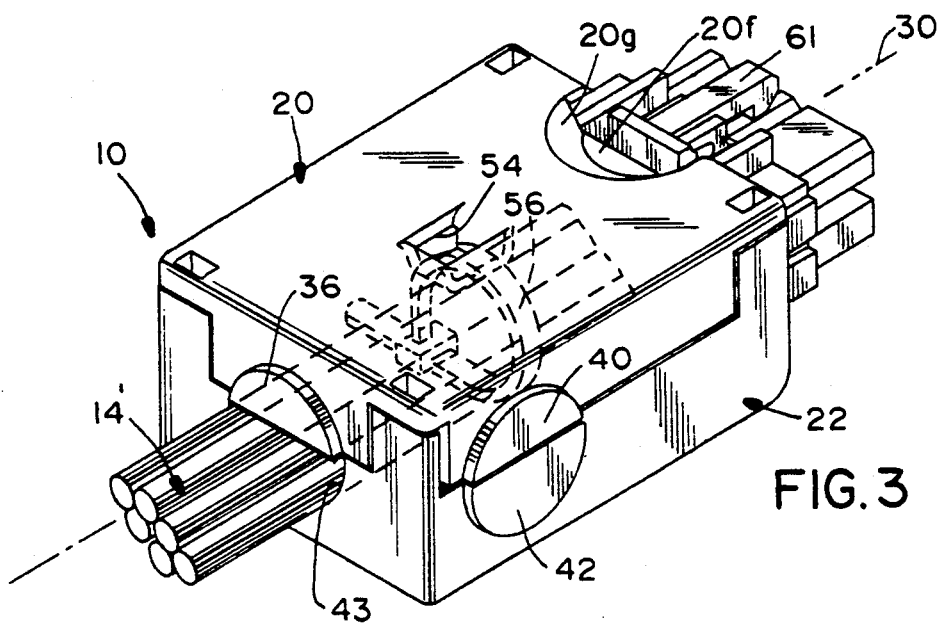
FIG. 3 is a perspective view similar to that of FIG. 1, but with the cable exiting the rear of the shell, with only one-half of the exit opening exposed, and with a cable tie shown in phantom within the shell.

Strain relief shell 10 is designed to provide a plural cable exiting arrangement. In other words, FIGS. 1 and 2 show cable 14 exiting through side walls 20c and 22c of shell halves 20 and 22, respectively. This is considered a "90°" exiting orientation in that the cable exits from the strain relief shell perpendicular to a center line 30 of connector 12, the center line extending generally front-to-rear through the connector and the strain relief shell. The strain relief shell 10 is designed to lock onto the rear portion of connector 12 in one of two orientations. The orientation in FIGS. 1 and 2 results in a right 90° cable exit. The other orientation, not shown, results in a left 90° cable exit. FIG. 3 shows an electrical cable 14' exiting through rear walls 20b and 22b of shell halves 20 and 22, respectively. This exiting orientation is considered an "180°" exiting orientation in that the cable exits generally on the center line 30 of connector 12.

The invention contemplates a unique pair of cable exit opening constructions to effect the above-described plural cable exiting orientations. More particularly, FIGS. 1 and 2 show cable 14 exiting through a circular opening defined by semi-circular opening portions or recesses 32 in side wall 20c of shell half 20 and 34 in side wall 22c of shell half 22. Therefore, the semi-circular recesses 32 and 34 in the respective shell halves combine to define a circular exit opening for cable 14 through the side of the strain relief shell transverse to center line 30.

With shell halves 20 and 22 unitarily molded of dielectric material, the invention contemplates break-away or severable plug means for removably closing the cable exit openings in the strain relief shell, with the plug means being molded integrally with the shell halves. Now, looking at rear wall 20b of shell half 20 and rear wall 22b of shell half 22 in FIGS. 1 and 2, it can be seen that a semi-circular plug portion 36 is unitarily molded with the rear wall of shell half 20 and a semi-circular plug portion 38 is unitarily molded with the rear wall of shell half 22. With cable 14 exiting from the strain relief shell in its 180° orientation, plug portions 36 and 38 are retained to close and seal the rear of the shell.

Now, turning to FIG. 3 in conjunction with FIGS. 1 and 2, it can be seen that cable 14' exits the strain relief shell in its 180° orientation, i.e. on center line 30. In this orientation, it can be seen in FIG. 3 that a semi-circular plug portion 40 closes and seals semi-circular recess 32 (FIGS. 1 and 2), and a semi-circular plug portion 42 closes and seals semi-circular recess 34 (FIGS. 1 and 2).

Therefore, it can be seen by comparing FIGS. 1 and 2 with FIG. 3, that an electrical cable can exit either through an opening 32/34 (FIG. 1) in the side or through an opening 43 (FIG. 3) in the rear of strain relief shell 10, while maintaining the other opening closed and sealed, simply by severing or breaking-away plug portions 36, 38, 40 or 42 in a selective manner. Although only two openings (32/34 and 43) are present, three cable extending directions are possible. One is the 180° orientation out of opening 43. The other two are 90° from the center line out of opening 32/34 pointing to the right as it appears in FIGS. 1 and 2 or to the left which is opposite to the direction in FIGS. 1 and 2.

Still further, the invention contemplates that the exit openings in the strain relief shell be selectively variable. This can be seen by the depiction of FIG. 3, wherein plug portion 38 (FIGS. 1 and 2) of shell half 22 has been broken away, while plug portion 36 of shell half 20 is still maintained in place. This has been done because cable 14' has fewer discrete wires 14a than cable 14 in FIGS. 1 and 2.

Figure 4:
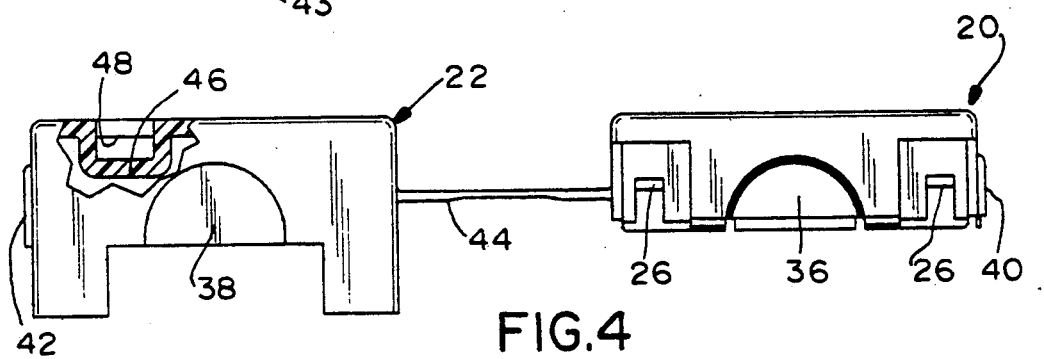
FIG. 4 is a fragmented end elevational view of the shell halves, and showing the shell halves still joined by an integral web from manufacture.
Figure 5:
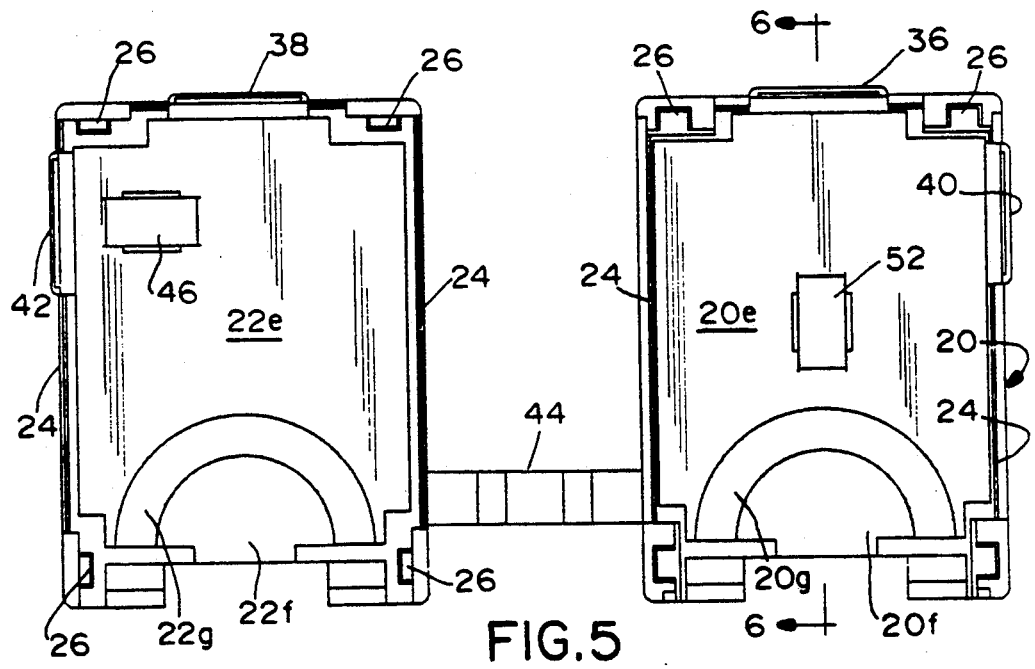
FIG. 5 is a bottom plan view of the depiction of FIG. 4.

FIGS. 4 and 5 show that shell halves 20 and 22 can be unitarily molded in a molding operation and joined by an integral connecting web 44 of the plastic material of the shell halves. This is convenient so that the shell halves can be shipped or handled as a subassembly for later assembly to a connector 12 and a cable 14/14'.

Referring to FIGS. 4-8, generally, the invention contemplates a pair of holding means integral with the strain relief shell, in the interior cavity defined by the shell halves, for holding a cable tie about cable 14 or 14' in either of the directions of orientation shown in FIGS. 1 and 2 or in FIG. 3.

More particularly, a holding loop 46 is molded integrally with the inside of wall 22e of shell half 22 in-line with the side cable exit opening defined by plug portion 42. As seen in FIG. 4, this integrally molded loop 46 defines a through passage 48 for receiving a cable tie 50 (FIG. 2) wrapped around electrical cable 14. The cable tie may be of the ratchet-type configuration for securing cable 14 having various cross sectional sizes in one or more wires within the strain relief shell for relieving stress between the cable and electrical connector 12 should any pulling forces be exerted on the cable.

Figure 6:
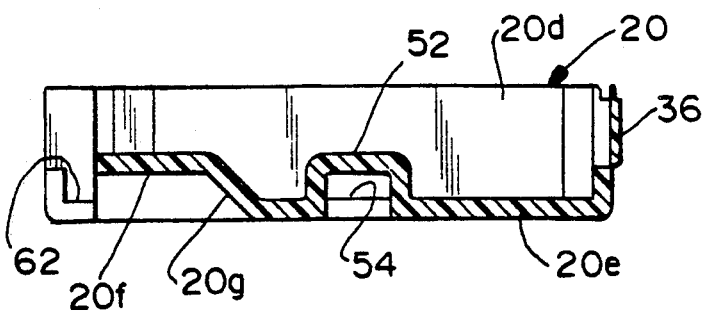
FIG. 6 is a section taken generally along line 6—6 of FIG. 5.
Figure 7:
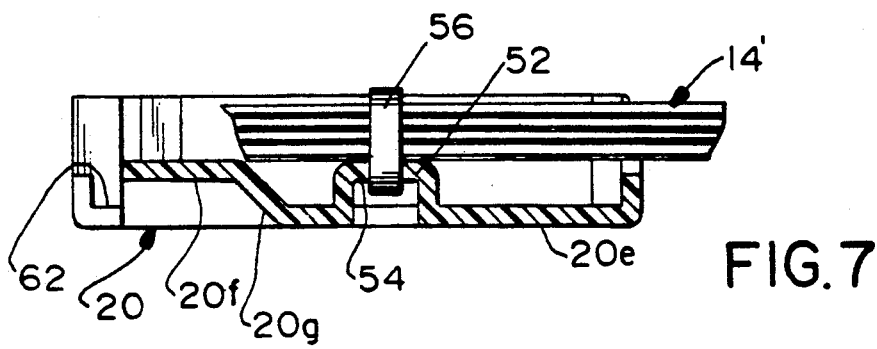
FIG. 7 is a view similar to that of FIG. 6, with a cable exiting from the shell and secured by a cable tie.

Similarly, a loop 52 is integrally molded on the inside of wall 20e of shell half 20 within the cavity of the strain relief shell defined by the shell halves. As seen in FIGS. 6 and 7, loop 52 defines a through passage 54 for receiving a cable tie 56 wrapped around cable 14' to secure the cable within the cavity defined by the shell halves. As seen particularly in FIGS. 5 and 8, loop 52 and cable tie 56 are in-line with center line 30 of connector 12 and with plug portions 36 and 38 in the rear walls of the shell halves.

Figure 8:
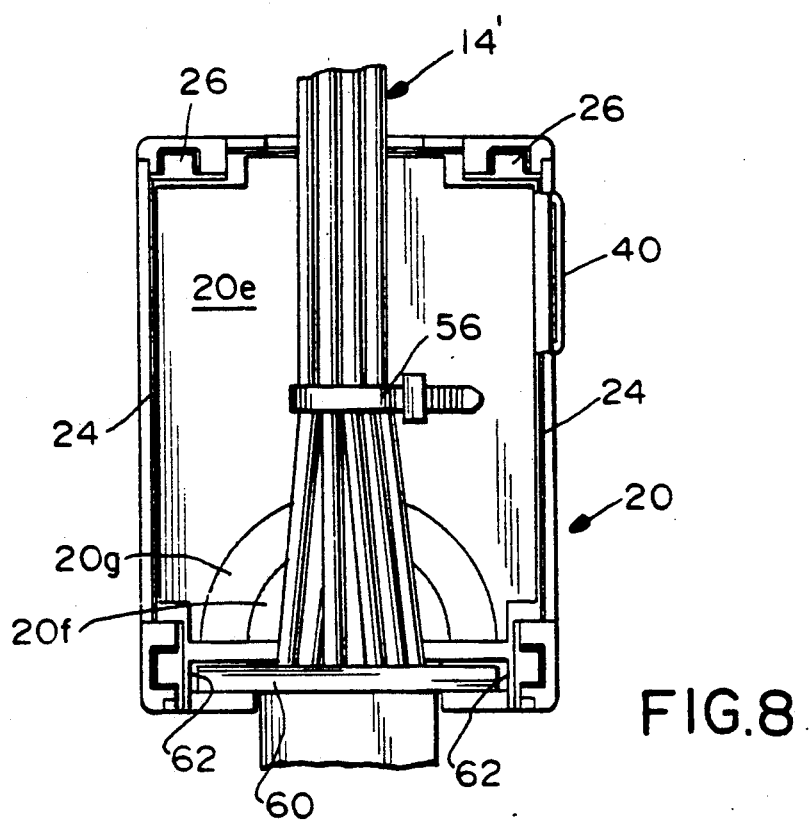
FIG. 8 is a top plan view of the depiction of FIG. 7.

FIG. 8 shows how electrical connector 12 has a peripheral flange 60 positionable within grooves 62 in the shell halves to sandwich the connector between the shell halves and secure the connector in the position shown best in FIG. 2.

Figure 9:
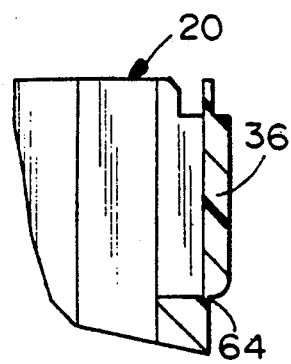
FIG. 9 is a fragmentary sectional view through one of the cable exit openings in one of the shell halves to show the break-away plug portion before removal.

Lastly, FIG. 9 shows, in an enlarged depiction, that plug portion 36 in shell half 20 is integrally molded with the shell half and has weakened or "thin" area 64 about the periphery of the plug portion to permit ready severance or breaking away of the plug portion from the shell half. All of the other plug portions 38, 40 and 42 similarly are constructed or integrally molded with their respective shell halves, with the weakened or thin peripheral areas.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a strain relief shell for relieving stress between an electrical connector and an electrical cable, including a pair of complementarily interengageable shell halves each having a generally flat body wall and end walls defining an interior cavity where the flat body walls are parallel to each other and the end walls of one shell half abut the end walls of the other shell half, means operatively associated between the shell halves releaseably engaging the electrical connector on a given center line, wherein the improvement comprises a pair of cable exit openings through the shell at different orientations in the end walls such that the cable can exit from one opening in a direction generally parallel to said center line and from the other opening in one of two directions generally transverse to the center line, and holding means integral with the generally flat body wall of each shell half accessible from the interior cavity for holding a cable tie about the cable within said interior cavity respectively in one of any of said directions.

2. In a strain relief shell as set forth in claim 1, wherein each of said shell halves is unitarily molded of dielectric material such as plastic, and said holding means is molded integrally with each shell half on the interior thereof.

3. In a strain relief shell as set forth in claim 1, wherein each of said shell halves is unitarily molded of dielectric material such as plastic, and including breakaway plug means for removably closing said cable exit openings, the plug means being molded integrally with at least one of the shell halves.

4. In a strain relief shell as set forth in claim 3, including weakened material about the periphery of said plug means to facilitate breaking the plug means away from the at least one shell half.

5. In a strain relief shell as set forth in claim 3, wherein said break-away plug means for each opening include a first plug portion molded integrally with one of the shell halves and a second plug portion molded integrally with the other shell half, whereby less than the entire respective cable exit opening can be exposed to accommodate different sized cables.

6. In a strain relief shell as set forth in claim 5, wherein said cable exit openings and said plug means are generally circular, and said plug portions are generally semi-circular.

7. In a strain relief shell as set forth in claim 1, wherein each of said shell halves is unitarily molded of dielectric material such as plastic, and said holding means comprise loops molded integrally with the shell halves and projecting into the interior thereof.

* * * * *